J. E. GILSON.
IGNITER ACTUATING MECHANISM.
APPLICATION FILED MAR. 30, 1914.
1,142,086. Patented June 8, 1915.
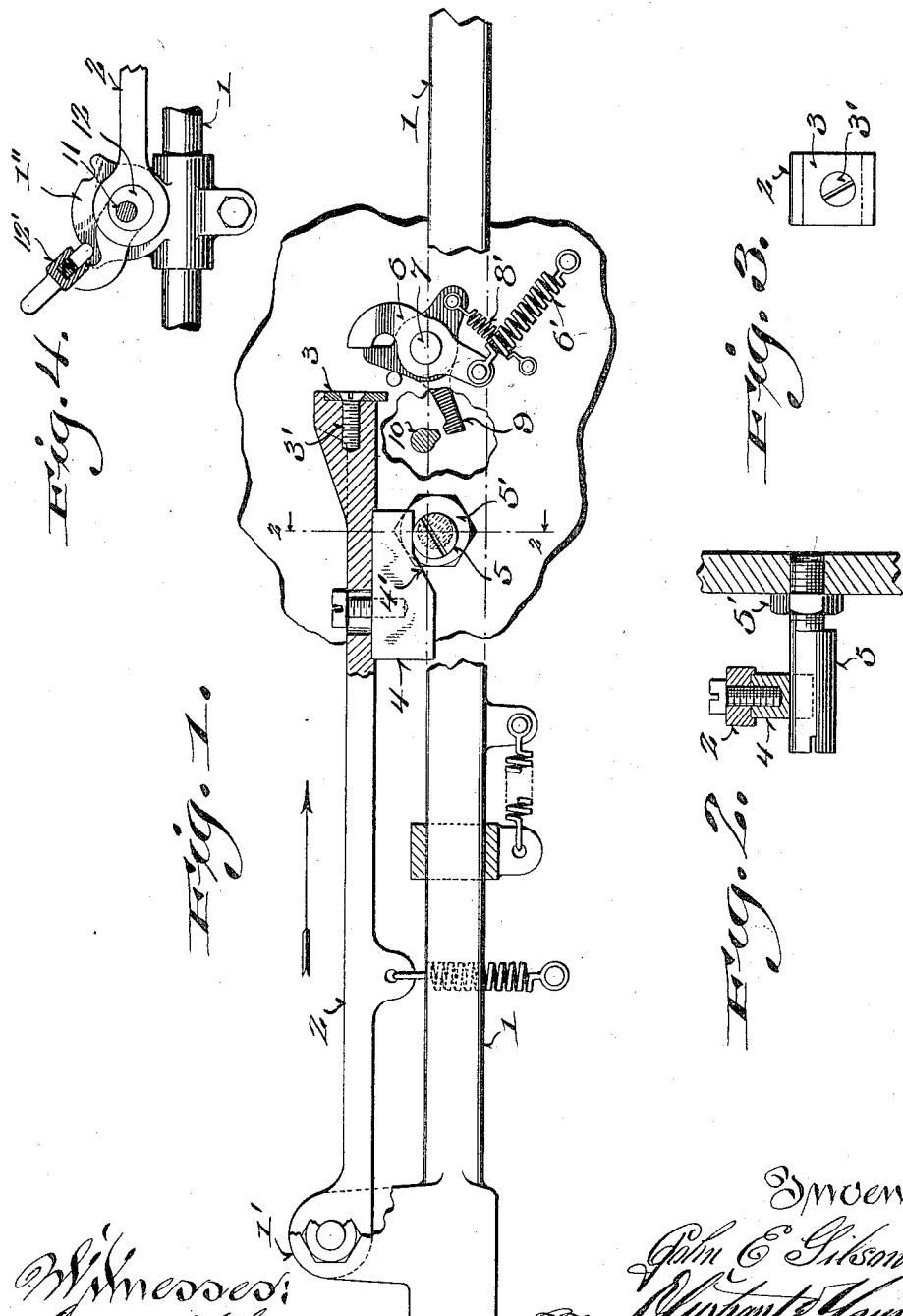

UNITED STATES PATENT OFFICE.

JOHN E. GILSON, OF PORT WASHINGTON, WISCONSIN, ASSIGNOR TO GILSON MANUFACTURING COMPANY, OF PORT WASHINGTON, WISCONSIN.

IGNITER-ACTUATING MECHANISM.

1,142,086.    Specification of Letters Patent.    Patented June 8, 1915.

Application filed March 30, 1914. Serial No. 828,334.

*To all whom it may concern:*

Be it known that I, JOHN E. GILSON, a citizen of the United States, and resident of Port Washington, in the county of Ozaukee and State of Wisconsin, have invented certain new and useful Improvements in Igniter-Actuating Mechanism; and I do hereby declare that the following is a full, clear, and exact description thereof.

The primary object of my invention is to provide a simple, economical and effective igniter actuating mechanism for internal combustion engines.

Specific objects of my invention are to provide a dog in pivotal connection with the valve-rod of an engine adapted to actuate and release the spring-controlled spark hammer trigger, whereby the spark-gap is produced; to provide a fixed cam-block in connection with the dog arranged to co-act with and ride upon an adjustable shoe, which adjustment is had to permit predetermined timing relative to the moment of producing the spark during the forward or sparking stroke of the valve-rod; to provide a hardened metallic tappet-plate in connection with the nose of the dog, which dog is preferably composed of cast metal, the hardened plate thus serving to resist wear resulting through its shearing engagement with the igniter trigger; to provide a general construction of igniter mechanism which is free from delicate work and can thereby be manufactured cheaply, such construction also resulting in prolonging the life of the mechanism.

With the above and other minor objects in view the invention consists in certain peculiarities of construction and combination of parts as hereinafter set forth with reference to the accompanying drawings and subsequently claimed.

In the drawings Figure 1 represents an elevation of a spark-actuating mechanism embodying the features of my invention with parts broken away and parts in section to more clearly show details of construction; Fig. 2, a detailed cross-section of the same, the section being indicated by line 2—2 of Fig. 1; Fig. 3, a detailed end view of the trigger-actuating dog showing the interchangeable hardened tappet-plate, and Fig. 4 represents a detailed sectional elevation of my preferred form of dog pivot, wherein the dog is adjusted to advance and retard the spark.

Referring by characters to the drawings, 1 represents a valve-rod which is arranged to be reciprocated by a suitable cam mechanism, not shown, the said cam-rod being provided with an apertured ear 1', to which ear is pivoted a malleable cast dog 2, the same being horizontally disposed and of considerable length and coarseness, whereby its movements will be positive and smooth in action. The dog is also under suitable spring control as shown. The nose of the dog is provided with a shouldered seat to which is fitted a rectangular tappet-plate 3, the same being held in position by a retaining screw 3'. This plate, as shown, is rectangular in form, whereby its four faces may be utilized as working edges to thus extend the life of the member. A cam-block 4 is adjustably secured to the dog 2 intermediate of its ends, the working surface of which cam-block comprises parallel faces upon different planes connected by an oblique face 4'. In the position shown in Fig. 1 of the drawings the cam-rod is traveling in the direction as indicated by the arrow upon its working stroke and the free end of the dog is supported by the upper face of the cam-block 4, which cam-block is in engagement with a shoe 5. The shoe 5 is in the form of an eccentric pin, whereby vertical adjustment is permitted due to rotation of the shank of said eccentric and, after being set in the desired position, the said eccentric is locked by a set-nut 5'.

An oscillatory spring-controlled trigger 6 is mounted upon an igniter-pad stud 7 and also mounted upon the stud 7 is a hammer finger 8 under control of a delicate spring 8', the finger being adapted to engage the trigger 6, which trigger is opposed by a master spring 6'. The finger 8 is also connected to a hammer arm 9, which hammer arm is incased within the combustion end of the engine cylinder and is normally held into engagement with an insulated contact block 10, this engagement being due to the fact that the spring 6' will cause the trigger 6 to engage the hammer finger 8 and thus shift the same in opposition to its delicate spring connection 8'.

The above make and break mechanism forms no part of my invention and is diagrammatically expressed for the purpose of demonstrating the igniter actuating mechanism embodying the features of my invention.

From the foregoing description it is obvious that when the inclined face 4' of the cam-block engages the dog supporting shoe, the nose of the dog will rise as it moves forward, and the working face of the tappet-plate will come into contact with the nose of the trigger 6. Continued movement of the valve-rod will cause the nose of the dog to force the trigger 6 backward, whereby contact between the block 10 and hammer 9 is effected due to the fact that the spring 8' will now exert a closing force upon the said contact members. In the meantime the oblique face 4' will cause the dog to lift whereby its tappet-plate will be stripped from engagement with the trigger 6 and said trigger being now loaded by the spring 6', will snap to its position of rest and thus engage the finger 8, whereby the spark members 9 and 10 will be separated to cause breaking of the circuit, resulting in a spark across the gap. Timing of the spark-gap can be accurately controlled by adjustment of the eccentric shoe over which the free end of the dog rides. This timing of the spark-gap can also be finely adjusted by movement of the cam-block 4 back and forth upon the dog.

Referring to Fig. 4 of the drawings, the ear 1'', which extends from the valve-rod, is in the form of a locking sector. The dog pivot-pin 11, in this instance, has mounted thereon an eccentric sleeve 12, upon which sleeve the hub of the dog is fitted. The eccentric sleeve is provided with a tail extension carrying a spring-plug 12', which plug is adapted to engage indentures in the segment. By this arrangement the eccentric sleeve may be manipulated to adjust the nose of the dog forwardly or backwardly, whereby the spark may be advanced or retarded.

I claim:

1. In an igniter mechanism having a spark-controlling trigger, an actuating dog having a nose engageable with the trigger, and a reciprocating valve-rod for imparting movement to said dog; the combination of an adjustable carrying means for advancing and retracting the dog relative to the trigger comprising a pin carried by the valve-rod, an eccentric sleeve mounted upon the pin constituting a pivot for said dog, a spring-controlled means for locking the sleeve in selective forward and rearward positions whereby the pivot point of the dog is shifted, an adjustable eccentric pin for supporting the outer end of said dog, a dog-lifting cam block interposed between the pin and dog, and means for adjusting the cam block backward or forward relative to the nose of said dog whereby the latter is elevated sooner or later in its forward movement.

2. In an igniter mechanism having a spark-controlling trigger, an actuating dog having a nose engageable with the trigger, and a reciprocating valve-rod for imparting movement to said dog; the combination of an adjustable carrying means for advancing and retracting the dog relative to the trigger comprising a pin carried by the valve-rod, an eccentric sleeve mounted upon the pin constituting a pivot for said dog, a spring-controlled means for locking the sleeve in selected forward or rearward positions whereby the dog nose is held in advanced or retracted position, a pin for supporting the outer end of said dog, a dog-lifting cam block interposed between the pin and dog, and means for adjusting the cam block backward or forward relative to the nose of said dog whereby the latter is elevated sooner or later in its forward movement.

3. An igniter actuating mechanism comprising a spring-controlled trigger, a reciprocative valve-rod, a pin carried by the valve-rod, an eccentric sleeve mounted upon the pin, a dog fulcrumed upon the eccentric sleeve having a nose for engagement with the trigger, quick adjusting means for shifting the eccentric sleeve whereby the pivot point of the dog is moved forwardly or backwardly to vary the distance between its engaging nose and said trigger, an eccentric guide pin for supporting the free end of the dog, a cam-block interposed between the dog and said pin, and means for adjusting the cam block with relation to the nose of the dog whereby the latter is raised coincident to forward movement of said dog sooner or later.

4. An igniter actuating mechanism comprising a reciprocative valve-rod, a dog, an eccentric pivot for the dog carried by the valve-rod, means for effecting quick adjustment of the eccentric pivot, whereby the dog is bodily moved forward or backward, means for locking the eccentric pivot in its adjusted position, an eccentric pin for the support of the outer end of said dog, a cam-block interposed between the eccentric pin and dog, and means for adjusting the cam-block backward and forward whereby the free end of the dog is lifted sooner or later coincident to forward movement of the same.

5. An igniter actuating mechanism comprising a reciprocative valve-rod, a dog having a tripping nose, means for pivotally adjusting the dog with relation to the rod, a pin for supporting the dog rearwardly of its nose, a cam-shoe carried by the free end of said dog for engagement with the pin, the cam-plate being provided with straight surfaces upon different planes connected by an oblique surface, and means for adjusting the cam-shoe upon the dog.

In testimony that I claim the foregoing I have hereunto set my hand at Port Washington in the county of Ozaukee and State of Wisconsin in the presence of two witnesses.

JOHN E. GILSON.

Witnesses:
A. R. BOERNER,
OLAF ELTON.

Copies of this patent may be obtained for five cents each, by addressing the "Commissioner of Patents, Washington, D. C."